Patented June 26, 1945

2,379,313

UNITED STATES PATENT OFFICE 2,379,313

ZINC SALT OF THE REACTION PRODUCTS OF ALKYLATED PHENOLS AND TERPENE-PHOSPHORUS SULPHIDE

Robert L. May, Chicago, Ill., assignor to Sinclair Refining Company, New York, N. Y., a corporation of Maine No Drawing. Application July 15, 1944, Serial No. 545,194

6 Claims. (Cl. 260—137)

This invention relates to a novel composition of matter and more particularly to a new class of organic-metal compounds comprising the zinc salts of organic compounds resulting from the reaction of an alkylated phenol with a condensation product of a terpene, such as present in turpentine, and phosphorus sulphide.

In my co-pending application Serial No. 494,688, filed July 14, 1943, I have described and claimed a novel class of resin-like materials resulting from the condensation of turpentine with a phosphorus sulphide, including phosphorus pentasulphide, $P_2S_5$. My co-pending application Serial No. 545,192, filed July 15, 1944, is directed to a novel class of compounds resulting from the reaction of an alkylated phenol with such condensation products of turpentine and $P_2S_5$.

I have now discovered that the products of the second-mentioned application react with zinc oxide, ZnO, to form a novel class of zinc salts of marked commercial value, particularly as components of lubricating oil compositions. Lubricating oil compositions comprising the zinc salts of my present invention are the subject of my co-pending application Serial No. 545,195, filed July 15, 1944.

In describing my present invention herein, I shall, for convenience and brevity, refer to the composition resulting from the reaction of turpentine with phosphorus pentasulphide as the turpentine-$P_2S_5$ condensation product and to the composition resulting from the reaction of said condensation product with alkylated phenol as the intermediate material, each of which is hereinafter more fully described.

Though the intermediate material itself has been found to be a desirable component of lubricating oil compositions, the use of such intermediate materials for this purpose is subject to certain disadvantages. For instance, it is subject to the objection that they have somewhat acidic characteristics due to phosphorus acidity, which has been found to have a tendency to promote sludging of mineral oil compositions. The products of my present invention are free from this objection.

In general, my new class of compounds may be prepared by reacting zinc oxide with the intermediate material by intimately admixing zinc oxide with the intermediate material with moderate heating. The product of this reaction is then with advantage diluted and filtered to remove any excess of zinc oxide present. Where it is desired subsequently to remove the diluent from the product, it is advantageous to use a volatile solvent as the diluent. However, where the product is to be used as a component of lubricating oil compositions, the diluent used is with advantage a light, neutral lubricating oil fraction which may be permitted to remain in the product.

The characteristics of the product of my present invention vary somewhat, depending upon the characteristics of the turpentine-$P_2S_5$ condensation product, the nature and proportions of the alkylated phenol reacted therewith to form the intermediate material, the conditions under which the reactions are effected, and, to some extent, upon the proportions of zinc oxide and the intermediate material used in its production. Also, the character of the product is influenced by the conditions under which the zinc oxide is reacted with the intermediate material.

The reaction temperature employed in the last-mentioned reaction in the preparation of my new class of zinc salts is, with advantage, maintained within the range of about 275 to 300° F., advantageously at approximately 280° F., though reaction temperatures, somewhat outside of this range, are permissible. I have also found it desirable to use an amount of zinc oxide somewhat in excess of that equivalent to the acid number of the intermediate material and to filter off unreacted, excess zinc oxide, as previously indicated.

The molar proportions of $P_2S_5$, turpentine and alkylated phenol used in the preparation of the intermediate material, which I react with zinc oxide in the preparation of my new class of compounds, may be varied over a considerable range. Molar proportions of 2:6:3 have been used with particular advantage, assuming the molecular weight of the turpentine to be 136. However, for each two moles of $P_2S_5$ there may be used 5 to 7 moles of turpentine and 1 to 5 moles of alkylated phenol, but it is desirable that the sum total of the number of moles of turpentine and the moles of alkylated phenol for each two moles of $P_2S_5$ fall within the range of about 8:10.

In the preparation of my new class of compounds considerable latitude is permissible in the selection of the alkylated phenol used. In general, the alkyl radical of the alkylated phenol should be a saturated aliphatic group. Each molecule of the alkylated phenol may contain one or more such groups. The number of carbon atoms in each aliphatic group is not critical. Desirable products may be obtained where each such group contains from 1 up to 12 to 16, or even up to 25 or 35 carbon atoms. Alkylated phenols containing 5 or more carbon atoms in each alkyl group have been found especially desirable, particularly in the preparation of compounds to be used as lubricating oil addends, because of the greater oil solubility of the resultant products. The alkyl group or groups may be either normal or branched chain.

Alkylated phenols, herein designated codimer alkylated phenols, such as prepared by the reaction, in the presence of sulphuric acid, of phenols with the olefines in commercial codimer, resulting from the phosphoric acid polymerization of mixed olefines of 4 carbon atoms or less per molecule and comprising propylene, butene-1, butene-2 and iso-butylene, the codimer consisting of a major portion of $C_8$ olefines, together with some $C_6$, $C_7$, $C_9$, $C_{10}$, $C_{11}$, $C_{12}$ and higher olefines, have been used with advantage. These codimer alkylated phenols are comprised primarily of mono- and poly-alkylated phenols having alkyl groups, as noted above, but with $C_8$ alkyl groups predominating.

I have further used with advantage in the preparation of the compounds of my present invention, alkylated phenols, prepared by the method just described for the preparation of codimer alkylated phenols except that the phenol was reacted with codimer bottoms, the codimer bottoms used being the bottoms obtained by a redistillation of the previously described codimer to a 350 to 360° F. end point overhead. This bottom was comprised primarily of $C_{12}$ olefines, but contains some somewhat lower and some somewhat higher molecular weight olefines.

I am unable at present definitely to identify by chemical formula either the compounds of my present invention or the intermediate material or the turpentine-$P_2S_5$ condensation product from which they are prepared. However, I have found it desirable that the turpentine-$P_2S_5$ condensation product used in the preparation of my zinc salts contains no unreacted $P_2S_5$.

Since the characteristics of my new products are influenced by the characteristics of the intermediate material from which they are prepared, the proportion of such intermediate materials and the characteristics thereof will be set forth in the hereinafter appearing specific illustrations of my present invention. However, it will be understood that my new class of zinc salts may be prepared directly from previously prepared intermediate products and that, though the zinc salts specifically illustrated have been found particularly desirable for special purposes, the invention is not limited to the specific products shown, but is illustrated thereby.

Generally, in the preparation of the turpentine-$P_2S_5$ condensation product, used in the production of my new zinc salts, the molar ratio of turpentine to $P_2S_5$ is, with advantage, approximately 3:1. However, this ratio may vary somewhat in either direction. For instance, highly desirable products may be produced from intermediate material which in turn have been produced from turpentine-$P_2S_5$ condensation products in which the ratio of turpentine to $P_2S_5$ is within the range of about 5:2 to about 7:2, as previously noted.

The reaction of turpentine with $P_2S_5$ is highly exothermic and proceeds spontaneously after being initiated by slight heating. A desirable method of effecting this reaction is to heat the turpentine in a vessel to about 200° F. and then, without further heating, slowly stirring in the phosphorus pentasulphide in the powdered form. The heat of reaction is great and, consequently, the sulphide should be added slowly so as to avoid the possibility of the reaction's becoming uncontrollable. For the purpose of my present invention, it is desirable that the temperature during this addition not be permitted to exceed about 250° F., although higher temperatures are permissible.

After the addition of phosphorus pentasulphide is completed and the exothermic heating is lessened, it is usually necessary to apply heat externally to complete the reaction. The temperature during this last stage is preferably maintained at about 300° F., though temperatures of about 200 to about 400° F. may be employed. The second stage of the reaction should be continued until all of the $P_2S_5$ is dissolved. The material thus prepared is a viscous liquid at elevated temperatures but, in the absence of excess turpentine, solidifies on cooling to room temperature.

In general, the intermediate material used in the preparation of my new zinc salts may be prepared by adding the alkylated phenol gradually to the turpentine-$P_2S_5$ condensation product, advantageously at a temperature of about 230° F. The optimum temperature of the condensation product for the introduction of the alkylated phenol will vary, depending upon the particular alkylated phenol used. During the final step of the production of the turpentine-$P_2S_5$ condensation product, the temperature will usually be substantially in excess of 230° F., usually about 300° F., and in commercial operations two to three hours would normally be required for lowering the temperature to 230° F. by natural cooling. Such cooling is usually unnecessary and may be avoided since these alkylated phenols are relatively stable toward heat and may safely be admixed with the turpentine $P_2S_5$ condensation products at temperatures as high as 300° F.

In reacting the alkylated phenols with the turpentine $P_2S_5$ condensation products, very little heat is evolved. After the alkylated phenol has been added, the mixture is maintained at an elevated temperature, advantageously at about 200° F. or higher, for about one hour with stirring.

The following specific examples of various members of my new class of compounds, and the procedure by which they have been successfully prepared, are given as illustrative of the class.

*Example I*

2040 grams of turpentine was placed in a flask equipped with a stirrer, a thermometer and a funnel, and heated therein to 240° F. There was then added to the turpentine 1110 grams of phosphorus pentasulphide at such a rate that the temperature of the reaction mixture did not rise above 275° F. The mixture was stirred during this addition. When all of the $P_2S_5$ had been added, the temperature of the mixture was raised to 300° F. and the mixture held at this temperature for two hours with stirring. At the end of this period, all of the phosphorus pentasulphide had dissolved and the product was a viscous, amber-colored liquid. Thereafter, the mixture was cooled to 230° F. and 1230 grams of p-tert-amyl phenol was added and the mixture stirred for one hour, at the end of which time 225 grams of zinc oxide was added, the mixture stirred for an additional hour and thereafter the temperature increased slowly to 280° F.

In order to facilitate filtration, the resulting product was thinned by intimately admixing therewith 4380 grams of a light petroleum lubricating oil fraction. The mixture was then filtered and the filtrate was found by analysis to have an acid number of 30.0 and an A. P. I. gravity of 11.1 and to contain 3.19% phosphorus, 8.64% sulphur and 0.48% zinc.

*Example II*

To a turpentine-$P_2S_5$ condensation product prepared, as in Example I, from 2040 grams of steam distilled wood turpentine, 1110 grams of powdered phosphorus pentasulphide, at a temperature of 230° F., there was added 1755 grams of diamylphenol and the mixture heated and stirred at a temperature of 200° F. for one hour. Thereafter, 225 grams of zinc oxide was added and the mixture stirred for one hour. The temperature was then gradually raised to 280° F. to complete the reaction.

The product of the reaction was then thinned, to facilitate filtration, by intimately admixing therewith 4905 grams of a light petroleum lubricating oil fraction and the mixture filtered. The filtrate was found by analysis to have an acid number of 28.3, an A. P. I. gravity of 13.1 and to contain 3.07% phosphorus, 7.82% sulphur and 0.24% zinc.

*Example III*

The product was prepared using the procedure, ingredients and proportions thereof identical with those of Example II, with the exception that the diamylphenol consitituent was added to the turpentine-$P_2S_5$ condensation product while the latter was at a temperature of 300° F. The product was thinned and filtered, as previously described, and the filtrate was found by analysis to have an acid number of 26.2, an A. P. I. gravity of 13.8 and to contain 3.11% phosphorus, 8.28% sulphur and .21% zinc.

*Example IV*

A product was prepared by the procedure of Example II from 1700 grams of turpentine, 1110 grams of $P_2S_5$, 1755 grams of diamylphenol and 56 grams of zinc oxide. The product was thinned by intimately admixing therewith 4565 grams of a light petroleum lubricating oil fraction and was then filtered. The filtrate was found by analysis to have an acid number of 33.3, an A. P. I. gravity of 13.1 and to contain 3.67% phosphorus, 10.28% sulphur and 0.182% zinc.

*Example V*

A product was prepared by the procedure of Example II from 2040 grams of turpentine, 1110 grams of $P_2S_5$, 1172 grams of diamylphenol and 56 grams of zinc oxide. The product was thinned by intimately admixing therewith 4322 grams of a light petroleum lubricating oil fraction and thereafter filtered. The filtrate was found by analysis to have an acid number of 28.3, an A. P. I. gravity of 11.9 and to contain 3.20% phosphorus, 9.36% sulphur and 0.090% zinc.

*Example VI*

A product was prepared by the procedure of Example II using the constituents and proportions therein described except that, in place of the diamylphenol, 1425 grams of a butene alkylated phenol having a phenol number of 294.3 and an apparent molecular weight of 190 was used and the resulting product was thinned by admixing therewith 4575 grams of the light petroleum lubricating oil fraction. After filtration the filtrate was found to have an acid number of 31.3, an A. P. I. gravity of 12.8 and to contain 3.13% phosphorus, 7.19% sulphur and 0.46% zinc.

*Example VII*

A product was prepared by the procedure of Example II, using the constituents and proportions therein described except that, in place of the d'amylphenol, 2050 grams of a codimer alkylated phenol having a phenol number of 203.7 and an apparent molecular weight of 275 was used and the product was thinned by intimately admixing therewith 5,200 grams of the light petroleum lubricating oil fraction. The product was then filtered and the filtrate was found by analysis to have an acid number of 23.7, an A. P. I. gravity of 14.4 and to contain 2.70% phosphorus, 7.83% sulphur and 0.13% zinc.

*Example VIII*

A product was prepared by the procedure described in Example II from 1632 grams of turpentine, 888 grams of $P_2S_5$, 2,149 grams of a codimer bottoms alkylated phenol, and 180 grams of zinc oxide. The codimer bottoms alkylated phenol used had a phenol number of 151.2 and an apparent molecular weight of 371. The resulting product was diluted by intimately admixing therewith 4669 grams of the light petroleum lubricating oil fraction and was filtered. The filtrate was found by analysis to have an acid number of 21.3, an A. P. I. gravity of 15.2, and to contain 2.86% phosphorus, 6.70% sulphur and 0.12% zinc.

*Example IX*

This product was prepared by the method and from the ingredients and proportions used in Example VIII except for using as the alkylated phenol constituent 1765 grams of a codimer alkylated phenol having a phenol number of 190.9 and an apparent molecular weight of 294. The product was diluted prior to filtration by intimately admixing therewith 4285 grams of the light lubricating oil fraction. The filtrate was found by analysis to have an acid number of 25.0, an A. P. I. gravity of 14.5 and to contain 2.68% phosphorus, 7.51% sulphur and 0.23% zinc.

*Example X*

This product was prepared by the method and from the ingredients and proportions used in Example VIII except for using as the alkylated phenol constituent 2670 grams of a codimer bottoms alkylated phenol, consisting of a mixture of a codimer bottoms alkylated phenol having a phenol number of 125.9 and an apparent molecular weight of 445 and a codimer bottoms alkylated phenol having a phenol number of 124.7 and an apparent molecular weight of 448. Prior to filtration 5,190 grams of the lubricating oil diluent was added. The filtrate was found by analysis to have an acid number of 19.8, an A. P. I. gravity of 16.6 and to contain 3.12% phosphorus, 5.88% sulphur and 0.11% zinc.

*Example XI*

This product was prepared by the method and from the ingredients and proportion used in Example VIII except for using as the alkylated phenol constituent 2570 grams of a codimer bottoms alkylated phenol consisting of a mixture of a codimer bottoms alkylated phenol having a phenol number of 134.9, an apparent molecular weight of 415 and a codimer bottoms alkylated phenol having a phenol number of 127.5 and an apparent molecular weight of 441. Prior to filtration, the product was diluted by the addition of 5090 grams of the lubricating oil fraction. The filtration was found by analysis to have an acid number of 20.5, an A. P. I. gravity of 16.5 and to contain 2.84% phosphorus, 6.43% sulphur and 0.07% zinc.

Example XII

This product was prepared by the method and from the ingredients and proportions used in Example VIII except for using as the alkylated phenol constituent, 1920 grams of a codimer bottoms alkylated phenol having a phenol number of 116.2 and an apparent molecular weight of 483. Prior to filtration the product was diluted by the addition of 4440 grams of the lubricating oil fraction. The product was found by analysis to have an acid number of 22.5, an A. P. I. gravity of 15.2 and to contain 2.62% phosphorus, 7.68% sulphur and 0.115% zinc.

The light petroleum oil fraction used in each of the foregoing examples to facilitate filtration was a Mid-Continent neutral having the following characteristics:

| | |
|---|---|
| Gravity | °A. P. I.  27.9 |
| Flash | °F.  365 |
| Fire | °F.  405 |
| Viscosity at 100° F., SUS | 107.8 |
| Viscosity at 210° F., SUS | 39.5 |
| Pour | °F.  20 |
| Color | 2– |

The codimer alkylated phenol and the codimer bottoms alkylated phenol were prepared as previously described herein.

From the foregoing specific illustrations, it appears that the combining ratios of zinc oxide and the intermediate materials vary somewhat with the excess of zinc oxide present. The duration of the reaction period also appears to influence the zinc content of the finished product. The presence of a considerable excess of zinc oxide during the reaction is usually desirable.

The turpentine-$P_2S_5$ condensation product from which the members of my new class of compounds are prepared is, in the absence of excess turpentine, normally a brittle, resinous solid. It is with advantage prepared from turpentine, either steam-distilled wood turpentine or gum spirits, consisting mainly of alpha pinene, a bicyclic terpene having the empirical formula $C_{10}H_{16}$. Pure alpha pinene and other more costly terpenes will react similarly with $P_2S_5$ but, for reasons including economic considerations, I prefer to use the more readily available turpentine. The turpentine used in the specific examples herein was a technical grade steam-distilled wood turpentine comprising about 90% alpha pinene.

I claim:

1. The reaction product of zinc oxide and an organic compound resulting from the reaction of the condensation product of turpentine and phosphorus pentasulphide with an alkylated phenol, the alkyl group of the alkylated phenol being a saturated aliphatic radical.

2. The reaction product of zinc oxide and an organic compound resulting from the reaction of the condensation product of turpentine and phosphorus pentasulphide with an alkylated phenol, the alkyl group of the alkylated phenol being a saturated aliphatic radical containing at least 5 carbon atoms.

3. The reaction product of zinc oxide and an organic compound resulting from the reaction of the condensation product of turpentine and phosphorus pentasulphide with a poly-alkylated phenol, the alkyl groups of the poly-alkylated phenol being saturated aliphatic radicals.

4. The reaction product of zinc oxide and an organic compound resulting from the reaction of a condensation product of turpentine and phosphorus pentasulphide with an alkylated phenol, the alkyl groups of the alkylated phenol being saturated aliphatic radicals of 8 to 12 carbon atoms each.

5. The reaction product of zinc oxide and an organic compound resulting from the reaction of a condensation product of turpentine and phosphorus pentasulphide with para-tertiary-amyl phenol.

6. The reaction product of zinc oxide and an organic compound resulting from the reaction of a condensation product of turpentine and phosphorus pentasulphide with di-amyl phenol.

ROBERT L. MAY.